(12) United States Patent
Wang

(10) Patent No.: US 8,233,529 B2
(45) Date of Patent: Jul. 31, 2012

(54) VIDEO DECODER

(75) Inventor: Chi-Hui Wang, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 1021 days.

(21) Appl. No.: 12/191,597

(22) Filed: Aug. 14, 2008

(65) Prior Publication Data
US 2010/0040133 A1   Feb. 18, 2010

(51) Int. Cl.
*H04N 7/12* (2006.01)
(52) U.S. Cl. .......... 375/240.01; 348/469; 348/571; 375/240; 386/300
(58) Field of Classification Search .......... None
See application file for complete search history.

(56) References Cited

U.S. PATENT DOCUMENTS

| | | | | |
|---|---|---|---|---|
| 4,965,669 A * | 10/1990 | Canfield et al. | ............. | 348/695 |
| 5,307,157 A * | 4/1994 | Kobayashi et al. | ........... | 348/708 |
| 5,845,039 A * | 12/1998 | Ko et al. | ............. | 386/275 |
| 5,926,220 A * | 7/1999 | Linzer | ............. | 375/240.25 |
| 2002/0141731 A1 * | 10/2002 | Elberbaum | ............. | 386/46 |
| 2002/0186323 A1 * | 12/2002 | Sacca | ............. | 348/488 |
| 2006/0056496 A1 * | 3/2006 | Smee et al. | ............. | 375/148 |
| 2007/0008427 A1 * | 1/2007 | Hong et al. | ............. | 348/465 |
| 2007/0067704 A1 * | 3/2007 | Altintas et al. | ............. | 714/795 |
| 2008/0259212 A1 * | 10/2008 | Fukumori | ............. | 348/505 |
| 2009/0167944 A1 * | 7/2009 | Cheng et al. | ............. | 348/536 |
| 2009/0322954 A1 * | 12/2009 | Le et al. | ............. | 348/665 |

* cited by examiner

*Primary Examiner* — Ayaz Sheikh
*Assistant Examiner* — Nicholas Sloms
(74) *Attorney, Agent, or Firm* — Thomas|Kayden

(57) ABSTRACT

A video decoder is provided. An analog-to-digital converter (ADC) converts an analog video signal into a plurality of samples at a sampling rate. A main processing path collects a plurality of odd samples to provide a first decoded video output and synchronization information. A plurality of even samples is converted into a plurality of first converted samples at a first predetermined frequency by a sample rate converter, and then filtered by a filter to obtain a second Y signal. A buffer stores the second Y signal, and reads the second Y signal in response to the timing information. An output sample rate converter converts the buffered output into a plurality of second converted samples at a second predetermined frequency. A parallel-to-serial converter receives the first decoded video output and the plurality of second converted samples to drive a second decoded video output.

9 Claims, 3 Drawing Sheets

VIDEO DECODER

BACKGROUND OF THE INVENTION

Field of the Invention

The invention relates to decoding video signals, and, more particularly, to enhancing video decoding for improving the sharpness of video images.

The television industry is undergoing significant changes as a result of the transition from the current standard definition television (SDTV) to high definition television (HDTV). As a result, high definition televisions are becoming increasingly available in the marketplace. As screens grow larger, viewers expect increased resolution. For the foreseeable future, however, HDTV sets must also be able to receive and display SDTV television signals (e.g., PAL, NTSC, SECAM) while broadcast facilities transition to the new HDTV standard (ATSC). Thus, HDTV sets providing increased resolution for SDTV signals, creating the subjective impression of a high definition television image, may be desirable.

The resolution of the video signal at the television receiver is largely determined by the bandwidth of the receiving channel. Sharp edges or boundaries in a video image are typically distributed at higher frequency bands. To increase sharpness of SDTV signals for better perceptual quality, the bandwidth must be fully exploited, particularly in higher frequency bands.

BRIEF SUMMARY OF THE INVENTION

Accordingly, the invention provides apparatuses for improving the sharpness of video signals. An analog-to-digital converter (ADC) converts an analog video signal into a plurality of samples at a sampling rate 2·R. A main processing path collects a plurality of odd samples to provide a first decoded video output and synchronization information, wherein the first decoded video output comprises a first Y signal, a Cb signal, and a Cr signal. The video decoder further comprises a sample rate converter, a filter, a buffer, an output sample rate converter, and a parallel-to-serial converter. The sample rate converter converts a plurality of even samples at a half-sampling rate R into a plurality of first converted samples at a first predetermined frequency. The filter filters the plurality of converter samples to obtain a second Y signal. The buffer stores the second Y signal, wherein the second Y signal is read from the buffer as a buffered output in response to the timing information, and the second Y signal is synchronized with the first Y signal. The output sample rate converter converts the buffered output into a plurality of second converted samples at a second predetermined frequency, wherein the second predetermined frequency is substantially the same as a frequency of the first Y signal. The parallel-to-serial converter receives the first decoded video output and the plurality of second converted samples to drive a second decoded video output, wherein an output rate of the second decoded video output is equal to an output rate of the first decoded video output combined with the plurality of second converted samples.

In another aspect of the invention, a video decoder comprises an analog-to-digital converter, a main processing path, N sub-processing path and a parallel-to-serial converter. The analog-to-digital converter operates at a sampling rate (N+1)·R, for digitizing the composite video signal to obtain a plurality of samples. The main processing path collects $$\frac{1}{(N+1)}$$

portion of the samples to provide a first decoded video data and synchronization information, wherein the first decoded video data has a first Y signal, a Cb signal, and a Cr signal. Each sub-processing path collects an individual $$\frac{1}{(N+1)}$$

portion of the plurality of the samples to generate a corresponding Y signal. The parallel-to-serial converter receives the first decoded video output and the plurality of Y signals to drive a second decoded video output, wherein an output rate of the second decoded video output equals the sum of an output rate of the first decoded video output and output rates of every corresponding Y signal.

BRIEF DESCRIPTION OF THE DRAWINGS

The invention will become more fully understood from the detailed description, given herein below, and the accompanying drawings. The drawings and description are provided for purposes of illustration only, and, thus, are not intended to be limiting of the invention.

DETAILED DESCRIPTION OF THE INVENTION

Figure 1:
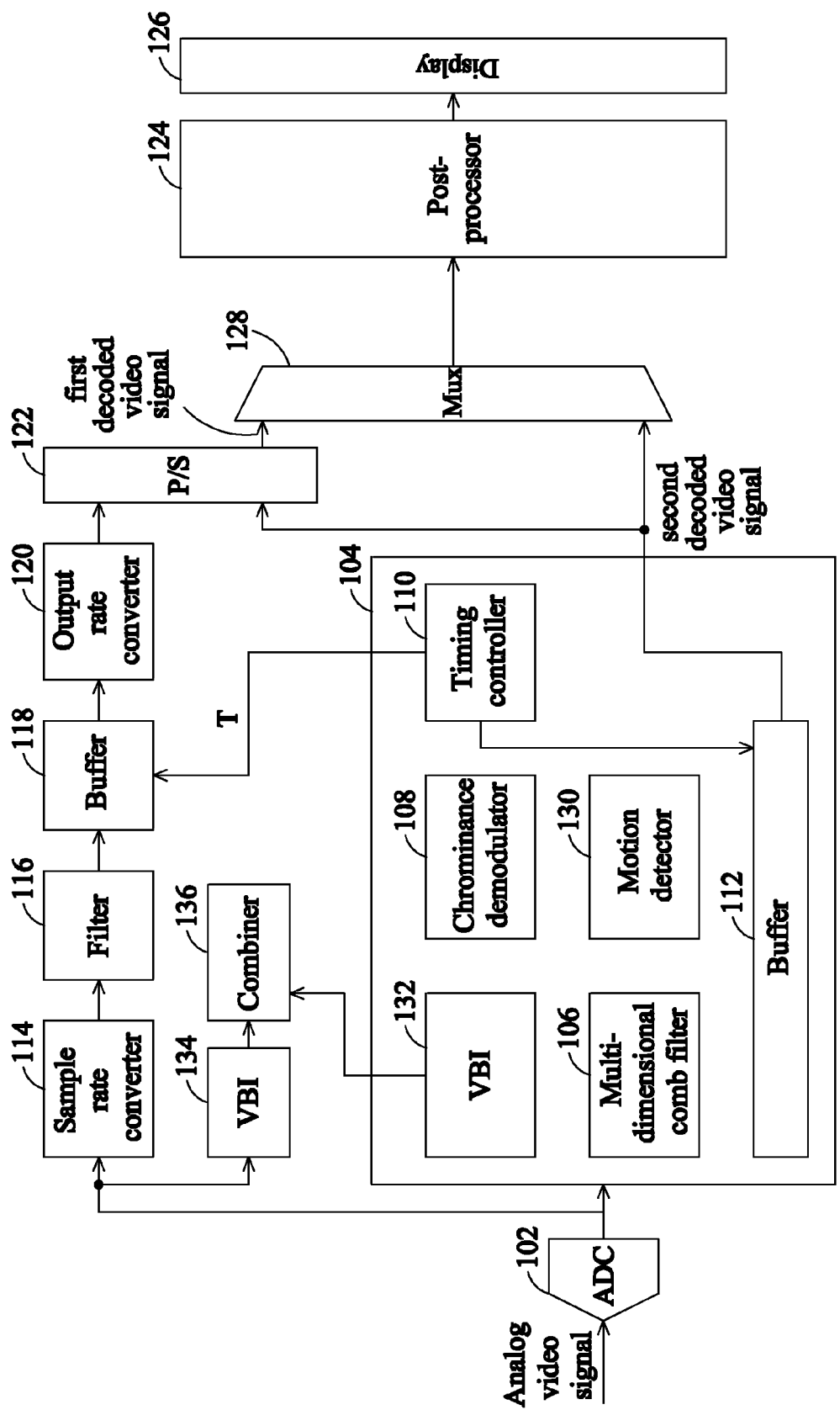
FIG. 1 shows an exemplary block diagram of a video decoder.
Figure 2:
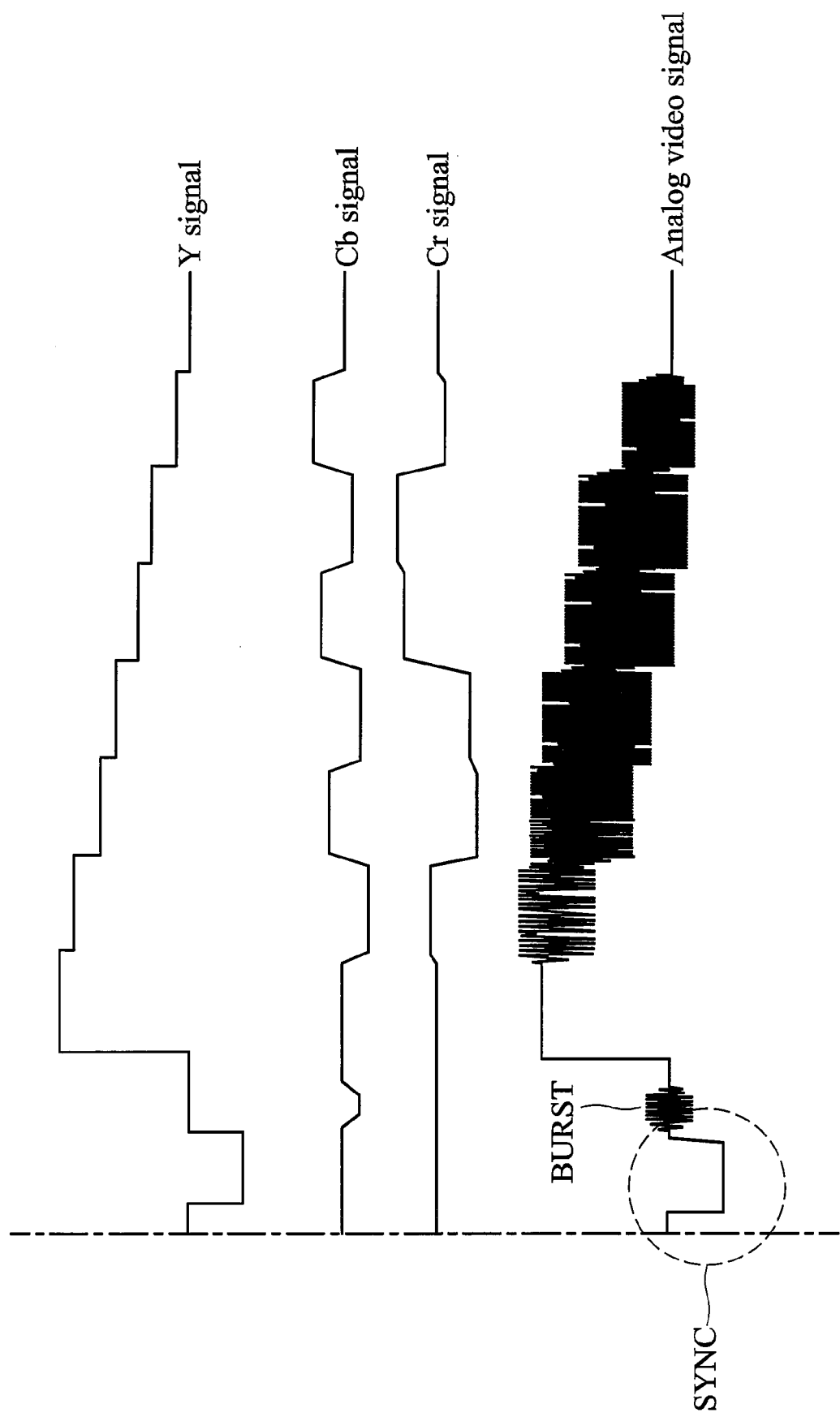
FIG. 2 shows an example of the analog video signal, the first Y signal and the Cb signal and Cr signal.

FIG. 1 shows an exemplary block diagram of a video decoder. An analog-to-digital converter (ADC) 102 converts an analog video signal into a plurality of samples at a sampling rate 2·R. The analog video signal may be a composite video signal, such as a CVBS signal, or other non-standard video signal. A main processing path 104 collects a plurality of odd samples to provide a first decoded video output and synchronization information (T), wherein the first decoded video output comprises a first Y signal, a Cb signal, and a Cr signal, or other signals which meet color television standards, such as NTSC, PAL, SECAM, and similar. In one embodiment, the main processing path 104 comprises a multi-dimensional filter 106, a chrominance demodulator 108, a timing controller 110, a buffer 112, etc. The multi-dimensional filter 106 may separate the plurality of odd samples into luminance information (Y) and chrominance (C) information. A chrominance demodulator 108 demodulates the chrominance information to obtain the Cb signal and the Cr signal. The timing controller 110 extracts timing information from the Y signal, Cb signal and the Cr signal. The timing may be horizontal sync pulse or vertical sync pulse. The buffer may be a line buffer or a frame buffer, storing the first Y signal, the Cb signal and the Cr signals. The first Y signal, Cb signal and Cr signal are read from the buffer 112 in response to timing information to ensure that each line has as many samples as are required by various television systems, and the samples on successive lines form a square grid. FIG. 2 shows an example of the analog video signal, the first Y signal and the Cb signal and Cr signal. Cb signal and Cr signal are modulated by a color carrier frequency and then superimposed on the Y signal. In the color carrier frequency sync signal, the burst is transmitted directly behind the line sync pulse, SYNC. The timing controller extracts the SYNC and burst signal to generate the time information.

The video decoder further comprises a sample rate converter 114, a filter 116, a buffer 118, an output sample rate converter 120, and a parallel-to-serial converter 122. The sample rate converter 114 converts a plurality of even samples at a half sampling rate R into a plurality of first converted samples at a first predetermined frequency. The first predetermined frequency can be selected according to the Nyquist Theorem, meaning, the predetermined frequency is at least twice the signal frequency. If, for example, the first predetermined frequency is four times greater than a color subcarrier frequency ($4 \cdot F_{SC}$) The various video coding processes differ in chrominance modulation and in particular make use of different color carrier frequencies. For example, in the NTSC system, the color subcarrier frequency is 3.58 MHz, and in PAL system, the color subcarrier frequency is 4.4 MHz.

The filter 116 filters the plurality of converted samples to obtain a second Y signal. The buffer 118 stores the second Y signal, wherein the second Y signal is read from the buffer as a buffered output in response to the timing information, and the second Y signal is synchronized with the first Y signal. The output sample rate converter 120 converts the buffered output into a plurality of second converted samples at a second predetermined frequency, wherein the second predetermined frequency is substantially the same as a frequency of the first Y signal. In some embodiments, the second predetermined frequency is 13.5 MHz. The parallel-to-serial converter 122 receives the first decoded video output and the plurality of second converted samples to drive a second decoded video output, wherein an output rate of the second decoded video output is equal to an output rate of the first decoded video output combined with the plurality of second converted samples. The output rate of the first decoded video output is preferably 13.5 MHz, and the output rate of the second decoded video output is 27 MHz.

Research shows that human eye is more sensitive to the luminance component of a video signal than the chrominance component. Thus, the sampling of the analog video signal is doubled to enhance the luminance component of a video signal, and together with the Y contribution, the resolution of a static image can be greatly increased.

The first decoded video output and the second decoded video output can be fed to a post-processor 124 and then to a display 126. The post-processor may provide enhanced picture quality, reduced noise, white/hue/brightness/saturation/contrast adjustments, on-screen display control (OSD), de-interlacing and similar.

The first decoded video output is a video data component suitable to worldwide standards. Alternatively, a multiplexer 128 selectively outputting the first decoded video output or the second decoded video output as decoded video data is used. The multiplexer 128 is controlled by a motion detector 130. When the motion detector 130 determines a current frame is a still image, the multiplexer 128 selects the second decoded video output as the decoded video data. In such cases, the main processing path 104 utilizes a 3-dimensional filter to separate luminance information and chrominance information. In other embodiments, the motion detector 130 can be replaced by a non-standard signal detector. When the non-standard signal detector determines a current frame is from non-standard signals, the multiplexer selects the second decoded video output as the decoded video data.

In some embodiments, the main processing path 104 further comprises a VBI module 132 receiving the plurality of odd samples to generate a VBI information, and the video decoder further comprises a second VBI module 134 receiving the plurality of even samples to generate a sub-VBI information, wherein the VBI information is combined with the sub-VBI information to form second VBI information.

The filter 116 can be a notch filter (band-stop filter) or a high pass filter for blocking out chrominance information of the plurality of even samples. The filter 116 can be a 2-dimensional Y/C separator or a 3-dimensional comb filter for generating the second Y signal. For reduced costs, a notch filter is preferable.

Figure 3:
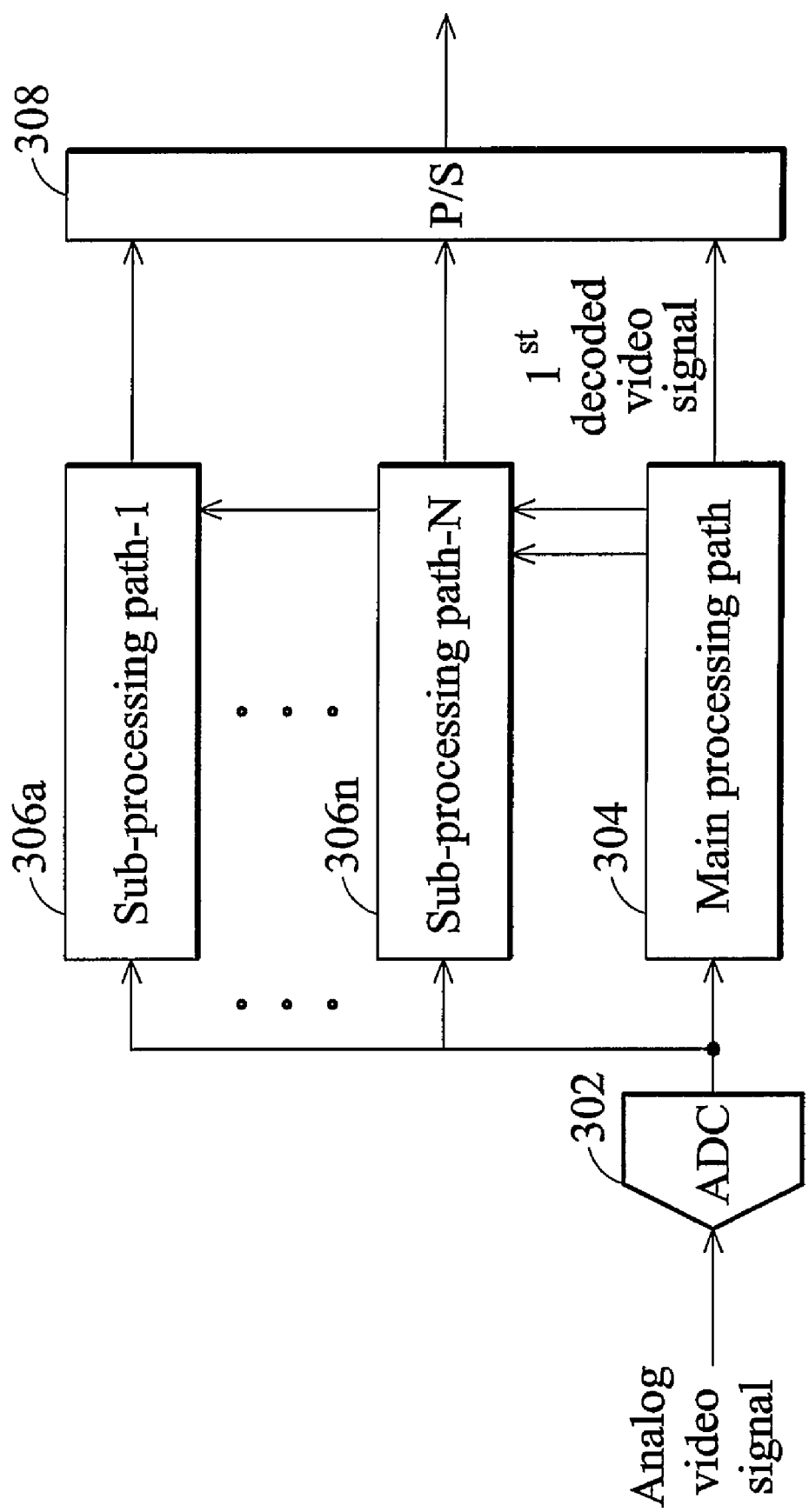
FIG. 3 shows another exemplary block diagram of a video decoder.

FIG. 3 shows another exemplary block diagram of a video decoder. The video decoder comprises an analog-to-digital converter 302, a main processing path 304, a plurality of sub-processing paths 306a-306n, and a parallel-to-serial converter 308. The analog-to-digital converter 301 converts an analog video signal into a plurality of samples at a sampling rate $(N+1) \cdot R$. The main processing path 304 collects $$\frac{1}{(N+1)}$$

of the samples to provide a first decoded video output and synchronization information, wherein the first decoded video output comprises a first Y signal, a Cb signal, and a Cr signal, or other signals which meet color television standards, such as NTSC, PAL, SECAM, etc. In one embodiment, the main processing path 304 comprises a multi-dimensional filter, a chrominance demodulator, a timing controller, a buffer, etc. The multi-dimensional filter may separate the $$\frac{1}{(N+1)}$$

of the samples into luminance information (Y) and chrominance (C) information. A chrominance demodulator demodulates the chrominance information to obtain the Cb signal and the Cr signal. The timing controller extracts timing information from the Y signal, Cb signal and the Cr signal. The buffer stores the first Y signal, the Cb signal and the Cr signals, and the first Y signal, Cb signal and Cr signal are read from the first buffer in response to timing information.

Sub-processing paths 306a-306n respectively provide a second Y signal, a third Y signal ..., a (N+1)-th Y signal. Each sub-processing path may comprise a sample rate converter, a filter, a buffer, and an output sample rate converter. Each sample rate converter converts $$\frac{1}{(N+1)}$$

samples at a second sampling rate R into a plurality of converted samples at a first predetermined frequency. The first predetermined frequency can be selected according to the Nyquist Theorem, for example, four times a color subcarrier frequency ($4 \cdot F_{SC}$). The filter, buffer, and output sample rate converter are substantially the same as previously described, hence further description thereof is omitted for brevity. Each output sample rate converter is further controlled by the time information, so that the second Y signal, the third Y signal . . . , and the (N+1)-th Y signal are synchronized with the first Y signal. The parallel-to-serial converter 308 receives the first decoded video output and the second Y signal, the third Y signal . . . , and the (N+1)-th Y signal to drive a second decoded video output, wherein an output rate of the second decoded video output is equal to an output rate of the first decoded video output combined with the plurality of Y signals.

Simulation results show that the described video decoders improve the bandwidth in a range 5 MHz to 6.75 MHz. The additional 1.75 MHz frequency band signal contributes significantly to the sharpness of decoded video output.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A video decoder, comprising:
    an analog-to-digital converter, operating with a sampling rate 2*R, for digitizing an analog video signal to obtain a plurality of samples;
    a main processing path collecting a plurality of odd samples to provide a first decoded video output and synchronization information, wherein the first decoded video output comprises a first luminance signal and a chrominance signal;
    a sample rate converter converting a plurality of even samples at a half sampling rate R into a plurality of first converted samples at a first predetermined frequency;
    a filter filtering the plurality of converter samples to obtain a second luminance signal, having a luminance component but no chrominance component;
    a buffer for storing the second luminance signal, wherein the second luminance signal is read from the buffer as a buffered output in response to the synchronization information, and the second luminance signal is synchronized with the first luminance signal;
    an output sample rate converter converting the buffered output into a plurality of second converted samples at a second predetermined frequency, wherein the second predetermined frequency is substantially the same as a frequency of the first luminance signal; and
    a parallel-to-serial converter receiving the first decoded video output and the plurality of second converted samples to drive a second decoded video output, wherein an output rate of the second decoded video output is equal to an output rate of the first decoded video output combined with the plurality of second converted samples;
    wherein the main processing path further comprises:
        a 3-dimensional filter for separating luminance information and chrominance information; and
        a motion detector for determining whether a frame is a still frame or a motion frame,
    wherein the video decoder further comprises a multiplexer that selectively outputs the first decoded video output or the second decoded video output as decoded video data, when the motion detector determines a current frame is a still image, the multiplexer selects the second decoded video output as the decoded video data.

2. The video decoder as claimed in claim 1, wherein the second predetermined frequency is four times a color subcarrier frequency (FSC).

3. The video decoder as claimed in claim 1, wherein the filter is a notch filter (band-stop filter) for blocking out chrominance information of the plurality of even samples.

4. The video decoder as claimed in claim 1, wherein the filter is a high pass filter for blocking out chrominance information of the plurality of even samples.

5. The video decoder as claimed in claim 1, wherein the filter is a 2-dimensional luminance/chrominance separator for generating the second luminance signal.

6. The video decoder as claimed in claim 1, wherein the filter is a 3-dimensional comb filter for generating the second luminance signal.

7. The video decoder as claimed in claim 1, wherein the main processing path further comprises:
    a 3-dimensional filter for separating luminance information and chrominance information; and
    a non-standard signal detector for determining whether a current frame is from non-standard signals,
    when the non-standard signal detector determines that the current frame is from non-standard signals, the multiplexer selects the second decoded video output as the decoded video data.

8. The video decoder as claimed in claim 1, wherein the main processing path further comprises a VBI (Vertical Blanking Interval) module receiving the plurality of odd samples to generate a VBI information, and the video decoder further comprises a second VBI module receiving the plurality of even samples to generate a sub-VBI information, wherein the VBI information combined with the sub-VBI information forms a second VBI information.

9. The video decoder as claimed in claim 1, wherein the synchronization information is extracted from sync pulses contained in the first luminance signal, and the chrominance signal.

* * * * *